DE WITT C. COOKINGHAM.
CONTROLLER FOR ELECTRIC VEHICLES.
APPLICATION FILED MAR. 19, 1913. RENEWED MAY 12, 1917.
1,250,144.
Patented Dec. 18, 1917.
3 SHEETS—SHEET 1.
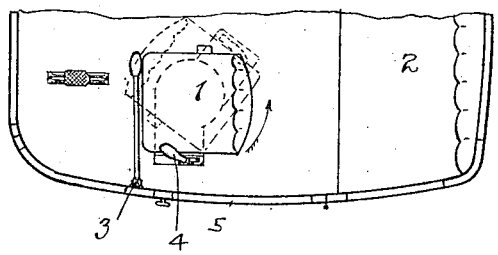
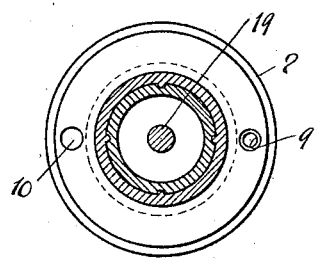
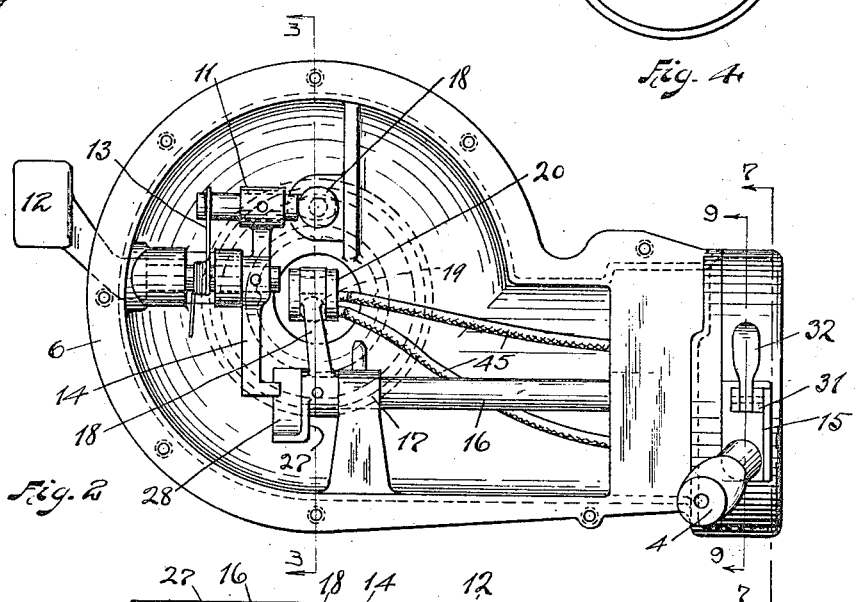
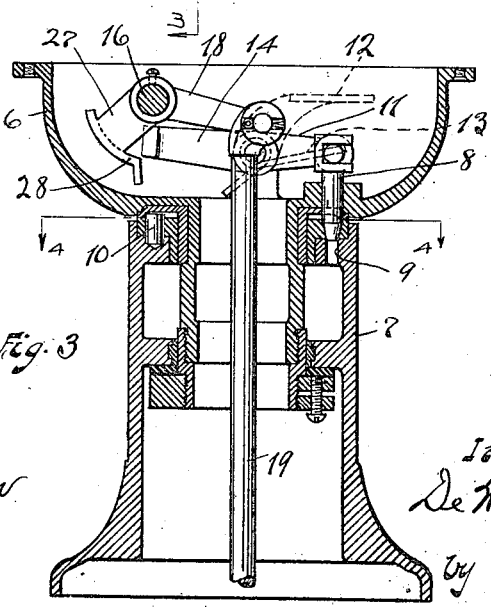

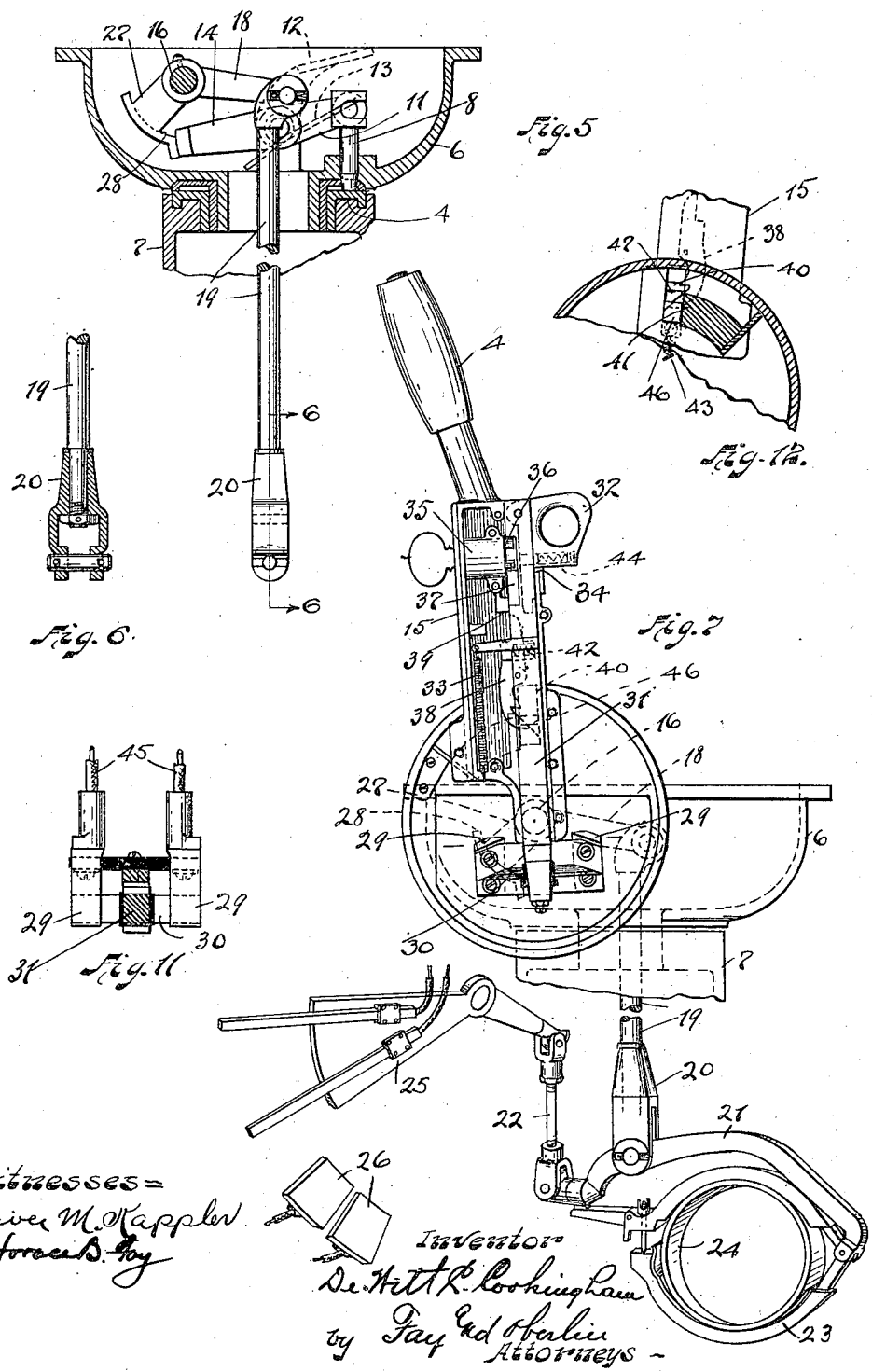

DE WITT C. COOKINGHAM.
CONTROLLER FOR ELECTRIC VEHICLES.
APPLICATION FILED MAR. 19, 1913. RENEWED MAY 12, 1917.
1,250,144.
Patented Dec. 18, 1917.
3 SHEETS—SHEET 3.
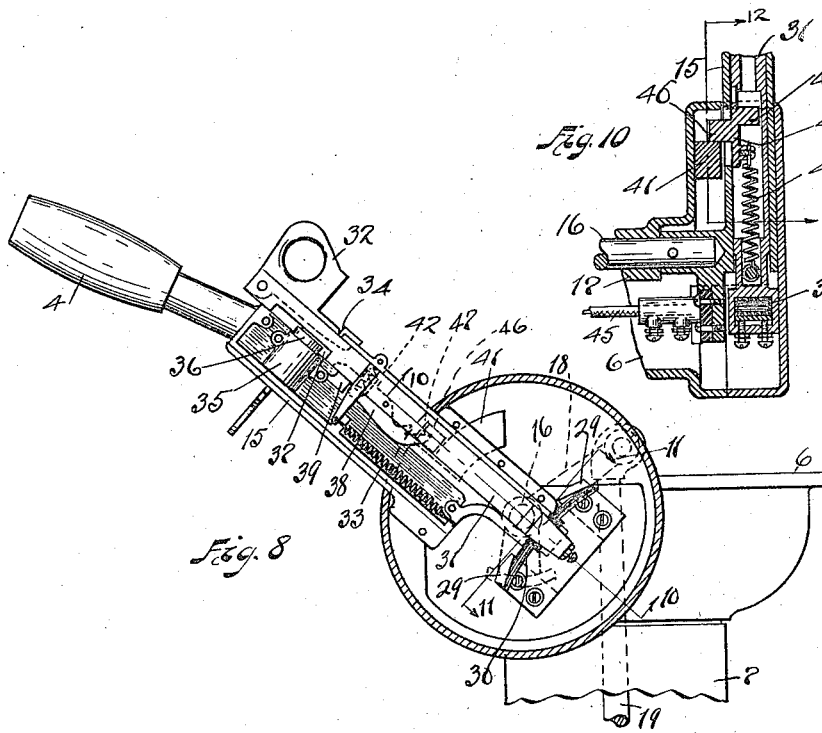
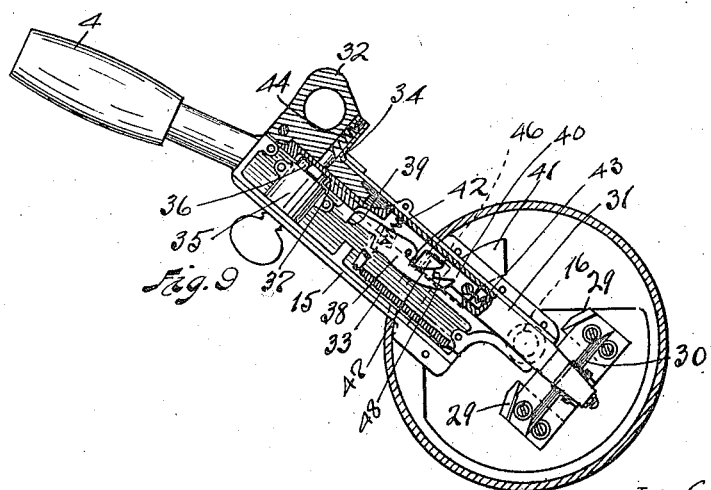

UNITED STATES PATENT OFFICE.

DE WITT C. COOKINGHAM, OF LAKEWOOD, OHIO, ASSIGNOR TO THE BAKER R & L COMPANY, OF CLEVELAND, OHIO, A CORPORATION OF OHIO.

CONTROLLER FOR ELECTRIC VEHICLES.

1,250,144.  Specification of Letters Patent.  Patented Dec. 18, 1917.

Application filed March 19, 1913, Serial No. 755,298. Renewed May 12, 1917. Serial No. 168,313.

*To all whom it may concern:*

Be it known that I, DE WITT C. COOKINGHAM, a citizen of the United States, and a resident of Lakewood, county of Cuyahoga, and State of Ohio, have invented a new and useful Improvement in Controllers for Electric Vehicles, of which the following is a specification, the principle of the invention being herein explained, and the best mode in which I contemplate applying that principle, so as to distinguish it from other inventions.

The present improved controller mechanism although not in any sense limited to one specific use, is nevertheless, especially designed for electric automobiles, or like vehicles propelled by electric motors. In such vehicles, it is usual to employ a controller lever, whereby the current may be shut off from the motor, or on, as desired, and whereby in the one position the amount of current can be varied through the interposition of suitable resistances in the motor circuit. It is likewise desirable to utilize the same handle to throw on a brake, either a brake applied to the armature of the motor, or to some other part of the driving mechanism of the vehicle whereby the current may be cut off and such hand brake, as it is called, applied, all by a single continuous movement of the handle.

The object of the present invention is to provide an improved controller mechanism of the general character described, which will be simple and yet at all times effective, and which will be rendered proof, so far as possible, against wrong operation whether through carelessness or excitement on the part of the operator. Certain features of the present invention, moreover relate more particularly still to the adaptation of the controlling mechanism for use on a movable or swivel seat, it having recently become popular in electric automobiles, to place one or more detached seats in front of the main fixed seat that extends transversely across the back of the vehicle body. In such a vehicle it is desirable of course that the controlling mechanism be operable from one of these forward detached seats, since the view of the driver from the rear seat would frequently be obscured by the front passenger. It is also desirable that such front seat be swiveled, as the amount of space available is limited, and in order to readily get in and out of the vehicle, the seat requires to be swung inwardly. The present controller is designed to be carried on a seat of this character and still retain the other advantageous features previously mentioned. To the accomplishment of the foregoing and related ends, the invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1 is a broken plan view of the seat arrangement in an electric automobile of the kind referred to above, wherein a swivel seat is located in front of the main fixed seat; Fig. 2 is a plan view of such swivel seat, the back and upholstering, of course, being removed, leaving simply the supporting base of the seat, and showing the mechanism of the controller so far as the latter is carried by said seat; Fig. 3 is a vertical transverse section of the seat as indicated by the line 3—3, Fig. 2; Fig. 4 is a horizontal transverse section of the same, as indicated by the line 4—4, Fig. 3; Fig. 5 is a broken sectional view corresponding to Fig. 3, but showing the parts in different operative position; Fig. 6 is a section of a detail of the controlling mechanism as indicated by the section line 6—6 Fig. 5; Fig. 7 is an end elevational view of the operating lever, or handle, of the controller, as viewed from the right in Fig. 2 with the cover plate removed, the view being in effect a section taken on the line 7—7, as indicated in said figure, and the connections between said operating lever and the hand brake and rheostat being also shown in this figure; Fig. 8 is a section of the operating handle corresponding to Fig. 7 but showing the parts in a different operative position; Fig. 9 is a section of the same handle as indicated by the line 9—9, Fig. 2; Fig. 10 is a broken section at right angles to that of Fig. 8, as indicated by the line 10—10, on said figure; Fig. 11 is a broken section taken on the plane indicated by line 11—11, Fig. 8; and Fig. 12 is a section on the line 12—12, Fig. 10, but with the parts differently positioned.

As shown in Fig. 1, the detached seat 1 designed for use of the driver is located forwardly of the main seat 2 and is located on the left hand side of the vehicle, said seat 1 being swiveled so as to turn in the direction indicated by the arrow, in order to permit the party occupying the same to more readily get out of the vehicle. It will be observed that the steering column 3, as well as the operating lever 4, of the controlling mechanism would be in such party's way, were he to attempt to get out to the left of the seat. It, furthermore, adds materially to the convenience if the seat is swiveled, as the occupant can then simply swing around in the seat until he faces substantially to the rear, thereby increasing the space between the rear seat 2 and such forward detached seat, and leaving him in position to step directly out either door 5. Only one such door, it should be explained, is shown in Fig. 1.

The base 6 (Fig. 2) of the seat proper is thus swiveled or pivotally mounted about a vertical axis in a pedestal, or fixed support 7, of any suitable design, that is attached to the bottom or floor of the vehicle. The details of the swivel mounting are fully shown in Fig. 3 and do not require special description. It will be noted, however, that the swivel base 6 of the seat proper is normally retained in proper position on the pedestal by means of a reciprocable plunger 8 that is adapted to engage an aperture 9 in the upper face of said pedestal, such face being formed so as to maintain the plunger in its raised position, as shown in Fig. 5, except in this particular location of the seat upon the pedestal. The lower end of the plunger is preferably beveled as shown, and the aperture correspondingly reamed, in order to facilitate the locking engagement of the two. There is also provided in the upper face of the pedestal at a point diametrically opposite to aperture 9, an upstanding pin or lug 10, which is adapted to engage the plunger, upon the seat being swung in either direction from its normal position, thus preventing more than a half turn of such seat.

Plunger 8 is adapted to be raised by means of a rocker-arm 11, on the outer end of which is a lever 12, while a spring 13 is arranged to normally press the plunger downwardly, so that it will enter the socket 9 in the pedestal when brought thereover. The rocker-arm which is thus operatively connected with the plunger, is also provided with a forwardly extending arm 14 that coöperates with the control mechanism, as will presently be described, it being observed that when the seat is located in position for driving, as in Figs. 1 and 2, this extension of the rocker arm is raised so as not to interfere with the control mechanism, as will clearly appear from inspection of Fig. 3.

The controller mechanism may, in part, be regarded as a modified form of the combined controller and circuit closer which forms the subject matter of Letters Patent No. 911,030 granted to me February 2, 1909. Thus controller handle 4, proper, forms the upper end of a hollow lever 15 in which are incased the various operative parts, the whole being mounted on a rock-shaft 16 that is carried in suitable bearings 17 in the seat-base 6, such bearings being alined in a general radial direction with reference to the pivotal axis of said seat. At its inner end, this shaft 16 is provided with a lever 18, the free end of which is substantially centrally disposed with respect to the axis of the seat, and is there pivoted to a connecting rod 19, that extends downwardly through the seat to a point below the floor level of the car or the vehicle. A yoke 20 is swiveled onto the lower end of this connecting rod and serves in turn to connect the same to a system of levers 21 and connecting rods 22 whereby either a brake band 23 may be tightened upon the brake wheel 24, or a rheostat arm 25 oscillated so as to occupy various positions with respect to a series of contacts 26. Such brake and rheostat are adapted to be thus operated upon movement of the handle 4 in a rearward and forward direction, respectively, from the position illustrated in Fig. 7, the handle, as there shown, occupying what may be called a neutral position, such rearward direction in the figure in question being to the right and the forward direction conversely to the left, as the parts there appear.

At the inner end of the rock shaft 16 and conveniently fashioned integrally with the lever arm 18 is a forwardly and downwardly extending arm 27 that has a lateral projection 28, of segmental form which in the normal position of the extension 14 of the rocker 11 for operating the plunger 8, swings clear of such extension. When, however, said plunger 8 is raised, as shown in Fig. 5, the forward end of this projection 28 will engage the extension in question and thereby prevent movement of the handled control lever 15 forwardly of its neutral position. It will be observed that said lever is nevertheless free to be swung backward, i. e. in a rearward direction, from its normal position.

It will also be observed that when this handled lever 15 is swung forwardly, the segmental projection 28 will be moved below the extension 14 of the plunger-operating rocker 11 so as to prevent said extension from being depressed, or in other words, the plunger from being raised. This situation occurs whenever the handled lever 15 of the controller is moved forwardly from its neutral position, and, it will be observed, effectively prevents the plunger from being raised so as to permit the seat to be swung about its axis, when said lever 15 has been moved to actuate the rheostat.

Not only does the handled lever of the controller thus serve to operate the hand brake and the rheostat, but it also carries the terminals 29 for the circuit of the machine, and means for closing or opening said terminals as desired, (see Figs. 7 to 11, inclusive). The means for closing such circuit comprise a brush 30 secured to the lower end of a plunger 31 vertically reciprocable within the casing portion of the controller lever and adapted to bridge said terminals when the plunger is raised. To thus lift the plunger and close the circuit by bringing this brush into contact with the terminals, a hand piece 32 is secured to the upper end of the plunger and lies outside the casing in position to receive the pressure of the operator's hand without requiring him to release the handle proper. This hand piece is shaped so that the finger of the operator may readily grasp the same to raise the plunger, while a tension spring 33 is connected at one end of the casing and at the other to a projection from the plunger so as to tend to depress said plunger and thereby break the circuit. In order to hold the plunger in its raised position, accordingly, the hand piece 32 is pivotally attached to said plunger, the pivotal axis being so disposed that in pulling upwardly on said hand piece its lower end will be swung out from within the casing and engage a notch or shoulder 34 in the latter, as is shown in Fig. 8. Accordingly, by simply striking, or pressing, upon the hand-piece from above, it will be swung inwardly so as to disengage its lower end from this notch, and thereupon the tension spring 33 becomes effective to depress the plunger 31 and break the connection between the terminals 29.

In the upper part of the casing 15, just below the handle 4, is provided a small lock case 35, the lock being preferably of the Yale type, having a barrel 36 which may be turned only when a suitable key is inserted. The inner end of this barrel is transversely slotted and disposed to lie in the path of a lug 37 on the front face of the plunger, so that in one position it will engage such lug and prevent the plunger from being raised, or in other words, prevent the circuit from being closed. This is the position illustrated in Figs. 7 and 9. However, in the position at right angles to the one just described, illustrated in Fig. 8, the slot in the inner end of the barrel is turned to permit the lug to pass by it and thus permit the plunger to be raised and the circuit closed.

While it will be seen that the lock can only be operated in the down position of the plunger, in other words, after the connection between the terminals has been interrupted, nevertheless such depression of the plunger by actuating hand piece 32, may take place in any position of the handled lever, whether forwardly or rearwardly of its neutral position shown in Fig. 7. When the plunger is thus depressed with the lever swung forwardly of its neutral position, an oscillatory dog 38 is simultaneously actuated, so as to engage a lug 39 in the casing 15 and prevent the plunger from being again lifted, irrespective of the lock 36, until the lever is swung back to neutral position, see Fig. 9. In other words, it is rendered impossible for the operator, having once broken the circuit, to close it again, until the handled lever is moved into neutral, or "off", position. The actuation of the dog 38 is secured through the engagement of a slide 40 reciprocably held in the plunger and adapted to engage with a segmental stop-block 41 (see Figs. 9 and 10), fixed to the casing in which the lower portion of the lever is housed. This segmental block is co-extensive with the "on", or rheostat-operating, position of the handled lever, so that it is only after the latter has been swung back past the rear end of this block that the slide 40 is free to resume its normal position in the plunger and thereby cause the dog to recede in order to permit the plunger to be again raised when desired. It will be observed that a spring 42 normally tends to throw the dog 38 out into its operative or stop-engaging position, and that another spring 43 similarly tends to pull the slide 40 into its lowermost position, which retains the dog in its inoperative position. Spring 43, of course, is made strong enough to overcome the tendency of spring 42, so that depression of plunger 31 when the lever is in neutral or "off" position does not cause any change in the position either of dog 38 or slide 40.

A spring 44 is also desirably utilized in connection with hand piece 32 in order to assist in throwing the latter out, and holding it, in engagement with shoulder 34, when the plunger is raised.

The slide 40 is adapted to engage the segmental stop 41, through the medium of a projection or lug 46 in said slide's inner face, and when this lug reaches the rear end of the stop, upon swinging the lever to neutral position, said lug drops behind such stop (see Figs. 7 and 12), and the lever cannot be pushed forwardly again until the plunger 31 has been raised. This is the situation represented in both of the figures just named, and will result, for example when, with the parts as shown in Fig. 9, the lever is swung back to neutral position. With the lock turned into the position of said Fig. 9, the plunger of course cannot be raised, save by using a key; neither can the lever be moved forwardly of neutral. Accordingly an unauthorized party cannot operate the vehicle by short circuiting the leads 45 at some accessible point, as might otherwise be attempted where such party understands the wiring scheme.

Similarly, an unauthorized party is prevented from raising slide 40 by any direct manipulation, when it has dropped so as to bring the lug 46 behind stop 41; for in such lower position of said slide, the tri-angular lug 47 on its front face, which serves to position the dog 38, lies in a notch 48 in said dog, as shown in Fig. 12, and cannot be raised without engaging said notch and at the same time throwing out the dog into position to engage the lug 39.

The leads 45 to the two terminals 29 are brought up through the hollow pedestal 7 of the seat, as shown in Fig. 4, the manner of attaching such leads to the terminals clearly appearing in Figs. 10 and 11. These leads are, of course, sufficiently flexible to permit the seat to be turned about upon its pivotal axis through the 180 degrees in either direction that is permitted by the stop 10 on the upper face of said pedestal. This stop, however, by thus limiting the angle to which the seat may be turned, and by preventing the seat from being turned around and around in the same direction, secures said leads against being twisted off.

The general mode of operation of my improved controlling mechanism should readily appear from the foregoing description of its various parts and of their individual modes of operation. Thus in the neutral position of the handled lever 15 as shown in Fig. 7, with the plunger 31 depressed, it will be observed that not only is the circuit broken across the terminals 29, but also the rheostat arm 25 is in its "off" position and the brake band 23 loose. In this position of the handled lever the position of the lever 27 is as shown in Fig. 3; in other words, the plunger 8 may be raised by actuating lever 12 and the seat be freely swung on its pivotal axis subject to the stop 10. In any position of the seat, however, the handled lever 15 may be swung backwardly from its neutral position in order to tighten the brake band 23. Accordingly, while it is impossible for the operator to swing the seat until the current is entirely shut off by bringing the lever back to neutral position, said lever may nevertheless be operated to throw on the brake as might be found desirable were the car to suddenly start up under the influence of gravity, for example, as the operator started to leave his seat.

Furthermore, it will be observed that once lever 12 is depressed to disengage the plunger 8, and the seat swung from its normal locked position the extension 14 on the rocker 11 is disposed to engage the segmental projection 28 on lever 27 so as to prevent any movement of the handled lever 15 forwardly of its neutral position. Accordingly, once the seat has been swung, it is impossible to throw on power accidentally or otherwise, until the seat is brought back into its proper position and locked.

The operation of the handled lever which actuates the controller proper, the rheostat with its various contacts and resistances being thus designated, will require only the briefest attention. The circuit may be broken in any position of the handled lever 31 by simply pressing on the hand-piece 32, for as soon as such pressure becomes sufficient to release said hand-piece from engagement with the shoulder 34, the spring 33 pulls the plunger 31 to its lower position. If such depression of the plunger occurs when the handled lever is forwardly of its neutral position, as for example, is shown in Figs. 8 and 9, the dog 38 is automatically thrown out, as shown in the last of said figures, so as to prevent the plunger from being raised again until the lever is swung back to its neutral or "off" position. Whenever the plunger is thus depressed, whether with the handled lever in on or off position, it may be locked by turning the barrel 36 in the case 35 and an unauthorized party thus prevented from closing the circuit.

The correlation of the operation of the various parts of the handled lever for actuating the controller and brake, with the position of the swivel seat, should be readily apparent from the foregoing description, and from such description it should likewise be apparent that not only is a very convenient and accessible arrangement of controller lever provided, but at the same time every possible precaution is taken against wrong operation of the controlling mechanism either through carelessness or misunderstanding on the part of the operator.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a motor vehicle, the combination with controlling mechanism therefor; of a seat permanently movably mounted on said vehicle; and actuating means for said mechanism, the movement of said seat being dependent upon the position of said means.

2. In a motor vehicle, the combination with controlling mechanism therefor; of a seat permanently movably mounted on said vehicle; and actuating means for said mechanism, the parts being so arranged and constructed that said means can be operated only in certain position of said seat and said seat can be moved only in certain position of said means.

3. In a motor vehicle, the combination with controlling mechanism therefor; of a swiveled seat; and actuating means for said mechanism carried by said seat, the position of said seat determining the operability of said means.

4. In a motor vehicle, the combination with controlling mechanism therefor; of a swiveled seat; and actuating means for said mechanism carried by said seat, the turning of said seat being dependent upon the position of said means.

5. In a motor vehicle, the combination with controlling mechanism therefor; of a swiveled seat; and actuating means for said mechanism carried by said seat, the parts being so arranged and constructed that said means can be operated only in certain position of said seat and said seat can be turned only in certain position of said means.

6. In a motor vehicle, the combination with a brake therefor; of a seat permanently movably mounted on said vehicle; and actuating means for said brake carried by said seat and adapted to operate said brake irrespective of the position of said seat.

7. In a motor vehicle, the combination with a brake therefor; of a swiveled seat; and actuating means for said brake carried by said seat and operable irrespective of the position of the latter.

8. In a motor vehicle, the combination with a brake therefor; of a swiveled seat; and actuating means for said brake carried by said seat and operable irrespective of the position of the latter, said means including a rock-shaft carried by said seat and provided with an operating lever, and connections through said seat to said brake.

9. In a motor vehicle, the combination of controlling mechanism therefor; a brake; a movable seat; and actuating means for said mechanism, said brake being operable irrespective of the position of said seat and the position of said seat determining the operability of said means.

10. In a motor vehicle, the combination of controlling mechanism therefor; a brake; a movable seat; and actuating means for said mechanism, said brake being operable irrespective of the position of said seat and the movement of said seat being dependent upon the position of said means.

11. In a motor vehicle, the combination of controlling mechanism therefor; a brake; a movable seat; and actuating means for said mechanism, said brake being operable irrespective of the position of said seat and the parts being so arranged and constructed that said means can be operated only in certain position of said seat and said seat can be moved only in certain position of said means.

12. In a motor vehicle, the combination of controlling mechanism therefor; a brake; a seat permanently movably mounted on said vehicle; actuating means for said mechanism; and actuating means for said brake carried by said seat and adapted to operate said brake irrespective of the position of said seat, the position of said seat determining the operability of said other actuating means.

13. In a motor vehicle, the combination of controlling mechanism therefor; a brake; a swiveled seat; actuating means for said mechanism; and actuating means for said brake carried by said seat and operable irrespective of the position of the latter, the position of said seat determining the operability of said other actuating means.

14. In a motor vehicle, the combination of controlling mechanism therefor; a brake; a swiveled seat; actuating means for said mechanism; and actuating means for said brake carried by said seat and operable irrespective of the position of the latter, said means including a rock-shaft carried by said seat and provided with an operating lever, and connections through said seat to said brake, the position of said seat determining the operability of said other actuating means.

15. In an electric motor driven vehicle, or the like, the combination with a motor controller; of a seat permanently movably mounted on said vehicle; and a lever for operating said controller, the movement of said seat being dependent upon the position of said lever.

16. In an electric motor driven vehicle, or the like, the combination with a motor controller; of a seat permanently movably mounted on said vehicle; and a lever for operating said controller, the parts being so arranged and constructed that said lever can be moved only in certain position of said seat and said seat can be moved only in certain position of said lever.

17. In an electric motor driven vehicle, or the like, the combination with a motor controller; of a seat permanently movably mounted on said vehicle and a lever carried by said seat for operating said controller, the movement of said lever being dependent upon the position of said seat.

18. In an electric motor driven vehicle, or the like, the combination with a motor controller; of a swiveled seat; and a lever carried by said seat for operating said controller, the movement of said lever being dependent upon the position of said seat.

19. In an electric motor driven vehicle, or the like, the combination with a motor controller; of a seat permanently movably mounted on said vehicle; and a lever carried by said seat for operating said controller, the movement of said seat being dependent upon the position of said lever.

20. In an electric motor driven vehicle, or the like, the combination with a motor controller; of a swiveled seat; and a lever carried by said seat for operating said controller, the turning of said seat being dependent upon the position of said lever.

21. In an electric motor driven vehicle, or the like, the combination with a motor controller; of a swiveled seat; and a lever carried by said seat for operating said controller, the parts being so arranged and constructed that said lever can be turned only in certain position of said seat and said seat can be turned only in certain position of said lever.

22. In an electric motor driven vehicle, or the like, the combination with a motor controller and a brake for said vehicle; of a movable seat; and a lever adapted when moved in opposite directions to operate said controller and said brake, respectively, said lever being movable to operate said controller in only one position of said seat but being free to operate said brake at all times.

23. In an electric motor driven vehicle, or the like, the combination with a motor controller and a brake for said vehicle; of a swiveled seat; means adapted to lock said seat in position for driving; and a lever carried by said seat and adapted when moved in opposite directions to operate said controller and said brake, respectively, said lever being movable to operate said controller only when the seat is locked in driving position, but being free to operate said brake at all times.

24. In an electric motor driven vehicle, or the like, the combination with a motor controller and a brake for said vehicle; of a swiveled seat; means adapted to lock said seat in position for driving; a lever carried by said seat and adapted when moved in opposite directions to operate said controller and said brake, respectively, said locking means preventing movement of said lever to operate said controller except when said seat is locked in driving position, said lever being free to operate said brake at all times; and means connected with said lever adapted to prevent operation of said locking means to unlock said seat except when said lever is in inoperative position with respect to said controller.

25. In an electric motor driven vehicle, or the like, the combination with a motor controller and a brake for said vehicle; of a suitable hollow support; a seat swiveled thereon; a rock-shaft carried by said seat and provided with an operating lever; and connections through said seat and support from said rock-shaft to said controller and brake adapted to operate the latter independently of the position of said seat.

26. In a motor vehicle, the combination with controlling mechanism therefor; of a suitable support; a seat swiveled on said support; means including a reciprocable plunger adapted to lock said seat in driving position; a rock-shaft carried by said seat and provided with an operating lever; connections through said seat from said rock-shaft to said controller; an arm on said rock-shaft adjacent to said connections; and a rocker on said seat for operating said locking plunger, said rocker being adapted in the inoperative position of said plunger to engage said arm and thereby limit the oscillation of said shaft.

27. In a motor vehicle, the combination with controlling mechanism therefor; of a suitable support; a seat swiveled on said support; means including a reciprocable plunger adapted to lock said seat in driving position; a rock-shaft carried by said seat and provided with an operating lever; connections through said seat from said rock-shaft to said controller; an arm on said rock-shaft adjacent to said connections and provided with a lateral projection; and a rocker on said seat for operating said plunger, said rocker having an extension, the projection on said arm being disposed to engage said extension and prevent actuation of said rocker in the position of said rock-shaft corresponding with the "on" position of said controller.

28. In a motor vehicle, the combination with controlling mechanism therefor; of a suitable support; a seat swiveled on said support; means including a reciprocable plunger adapted to lock said seat in driving position; a rock-shaft carried by said seat and provided with an operating lever; connections through said seat from said rock-shaft to said controller; an arm on said rock-shaft adjacent to said connections and provided with a lateral projection; and a rocker on said seat for operating said plunger, said rocker having an extension adapted in the inoperative position of said plunger to engage said arm and thereby limit the oscillation of said shaft to the "off" position of said controller, the projection on said arm being disposed to engage said extension and prevent actuation of said rocker in the position of said rock-shaft corresponding with the "on" position of said controller.

29. In an electric motor driven vehicle, or the like, the combination with a motor controller and a brake for said vehicle; of a suitable hollow support having an aperture; a seat swiveled on said support; a reciprocable plunger mounted in said seat and adapted to engage such aperture to lock said seat in driving position; a rock-shaft carried by said seat and provided with an operating lever; connections through said seat and support from said rock-shaft to said controller and brake and adapted to operate the latter independently of the position of said seat; an arm on said rock-shaft adjacent to said connections; and a rocker on said seat for operating said locking plunger, said rocker being adapted in the inoperative position of said plunger to engage said arm and thereby limit the oscillation of said shaft.

30. In an electric motor driven vehicle, or the like, the combination with a motor controller and a brake for said vehicle; of a suitable hollow support having an aperture; a seat swiveled on said support; a reciprocable plunger mounted in said seat and adapted to engage such aperture to lock said seat in driving position; a rock-shaft carried by said seat and provided with an operating lever; connections through said seat and support from said rock-shaft to said controller and brake and adapted to operate the latter independently of the position of said seat; an arm on said rock-shaft adjacent to said connections provided with a lateral projection; and a rocker on said seat for operating said plunger, said rocker having an extension adapted in the inoperative position of said plunger to engage said arm and thereby limit the oscillation of said shaft to the "off" position of said controller, the projection on said arm being disposed to engage said extension and prevent actuation of said rocker in the position of said rock-shaft corresponding with the "on" position of said controller.

31. In an electric motor driven vehicle, or the like, the combination with a motor controller; of a suitable hollow support; a seat swiveled thereon; an operating lever carried by said seat and connected through the same and said support with said controller; a movable circuit closing device carried by said lever; and leads to said device carried through said seat and support.

32. In an electric motor driven vehicle, or the like, the combination with a motor controller; of a suitable hollow support; a seat swiveled thereon; an operating lever carried by said seat and connected through the same and said support with said controller; a movable circuit closing device carried by said lever; leads to said device carried through said seat and support; and means limiting the turning of said seat on said support.

33. In an electric motor driven vehicle, or the like, the combination with a motor controller; of a suitable hollow support; a seat swiveled thereon; an operating lever carried by said seat and connected through the same and said support with said controller; a movable circuit closing device carried by said lever; leads to said device carried through said seat and support; a reciprocable plunger in said seat, said support being provided with an aperture adapted to receive said plunger and thereby lock said seat in driving position; and a projection on said support spaced from such aperture and adapted to engage said plunger and thereby limit the turning of said seat on said support.

34. In an electric motor driven vehicle, or the like, the combination with a movable seat; of a lever; and a movable circuit closing device carried by said lever, movement of said lever being dependent on the position of said seat and movement of said device being dependent upon the position of said lever.

35. In an electric motor driven vehicle, or the like, the combination with a movable seat; of a lever carried by said seat; and a movable circuit closing device carried by said lever, movement of said lever being dependent on the position of said seat and movement of said device being dependent upon the position of said lever.

36. In an electric motor driven vehicle, or the like, the combination with a swiveled seat; of a lever carried by said seat; and a movable circuit closing device carried by said lever, the movement of said lever being dependent upon the position of said seat and movement of said device being dependent upon the position of said lever.

37. In an electric motor-driven vehicle, or the like, the combination of a motor controller; a lever for operating said controller; a movable circuit closing device carried by said lever; and a movable seat, movement of said lever being dependent on the position of said seat, and movement of said device being dependent on the position of said lever.

38. In an electric motor-driven vehicle, or the like, the combination of a motor controller; a lever for operating said controller; a movable circuit closing device carried by said lever; and a movable seat, movement of said lever being dependent on the position of said seat, and movement of said seat and also of said device being dependent on the position of said lever.

39. In an electric motor-driven vehicle, or the like, the combination of a motor controller; a movable seat; a lever carried by said seat for operating said controller; and a movable circuit closing device carried by said lever, movement of said lever being dependent on the position of said seat, and movement of said device being dependent on the position of said lever.

40. In an electric motor-driven vehicle, or the like, the combination of a motor controller; a movable seat; a lever carried by said seat for operating said controller; and a movable circuit closing device carried by said lever, movement of said lever being dependent on the position of said seat, and movement of said seat and also of said device being dependent on the position of said lever.

41. In an electric motor-driven vehicle, or the like, the combination of a motor controller; a swiveled seat; and a movable circuit closing device carried by said seat, operation of said controller and movement of said device both being dependent on the position of said seat.

42. In an electric motor-driven vehicle, or the like, the combination of a motor controller; a swiveled seat; a lever for actuating said controller carried by said seat; and a movable circuit closing device carried by said lever, movement of said lever being dependent on the position of said seat, and movement of said device being dependent on the position of said lever.

43. In an electric motor-driven vehicle, or the like, the combination of a motor controller; a swiveled seat; a lever for actuating said controller carried by said seat; and a movable circuit closing device carried by said lever, movement of said lever being dependent on the position of said seat, and movement of said seat and also of said device being dependent on the position of said lever.

Signed by me, this 15th day of March, 1913.

DE WITT C. COOKINGHAM.

Attested by:
H. B. FAY,
JNO. F. OBERLIN.

Copies of this patent may be obtained for five cents each, by addressing the "Commissioner of Patents, Washington, D. C."